United States Patent
Kimura

(10) Patent No.: US 10,858,993 B2
(45) Date of Patent: Dec. 8, 2020

(54) VARIABLE VANE DEVICE MAINTENANCE METHOD AND VARIABLE VANE DEVICE

(71) Applicant: MITSUBISHI HITACHI POWER SYSTEMS, LTD., Yokohama (JP)

(72) Inventor: Hirofumi Kimura, Kanagawa (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 817 days.

(21) Appl. No.: 15/316,999

(22) PCT Filed: Jun. 18, 2015

(86) PCT No.: PCT/JP2015/067631
§ 371 (c)(1),
(2) Date: Dec. 7, 2016

(87) PCT Pub. No.: WO2016/006411
PCT Pub. Date: Jan. 14, 2016

(65) Prior Publication Data
US 2017/0114719 A1    Apr. 27, 2017

Related U.S. Application Data

(60) Provisional application No. 62/023,078, filed on Jul. 10, 2014.

(51) Int. Cl.
*F02C 7/042*      (2006.01)
*F04D 29/56*      (2006.01)
(Continued)

(52) U.S. Cl.
CPC ............ *F02C 7/042* (2013.01); *F01D 17/162* (2013.01); *F01D 25/002* (2013.01);
(Continued)

(58) Field of Classification Search
CPC ...... F02C 7/042; F01D 17/162; F01D 25/002; F01D 25/28; F01D 25/285; F01D 5/005
See application file for complete search history.

(56) References Cited

U.S. PATENT DOCUMENTS 3,227,176 A * 1/1966 Luebering .............. B64D 35/00
137/601.08
4,836,746 A * 6/1989 Owsianny ............. F01D 17/162
415/149.2
(Continued)

FOREIGN PATENT DOCUMENTS

GB          16592      9/1904
JP       47-16807 A    9/1972
(Continued)

OTHER PUBLICATIONS

Written Opinion dated Aug. 25, 2015, issued in counterpart Application No. PCT/JP2015/067631, with English translation (4 pages).
(Continued)

*Primary Examiner* — Ninh H. Nguyen
*Assistant Examiner* — Aye S Htay
(74) *Attorney, Agent, or Firm* — Westerman, Hattori, Daniels & Adrian, LLP

(57) ABSTRACT

The variable vane device maintenance method includes: a preparation step of preparing a ring including a first connection portion at which an attachment bracket is attached to the ring and a second connection portion at which the attachment bracket is attached at a position shifted from the first connection portion in a circumferential direction, the ring having the attachment bracket attached at the first connection portion; a release step of releasing a connection between a plurality of variable vanes and the ring and a connection between the ring and the attachment bracket at the first connection portion; a rotation step of rotating the ring by a predetermined angle; and a connection step of
(Continued)

connecting the plurality of variable vanes to the ring at positions different from positions before the release step and connecting the ring to the attachment bracket at the second connection portion.

3 Claims, 10 Drawing Sheets

(51) Int. Cl.
*F01D 17/16* (2006.01)
*F01D 25/00* (2006.01)

(52) U.S. Cl.
CPC ........ *F04D 29/563* (2013.01); *F05D 2230/72* (2013.01); *F05D 2230/80* (2013.01)

(56) References Cited

U.S. PATENT DOCUMENTS

| | | | | |
|---|---|---|---|---|
| 7,232,287 | B2* | 6/2007 | Regunath | G05B 13/021 |
| | | | | 415/160 |
| 8,668,443 | B2 | 3/2014 | Espasa et al. | |
| 2009/0116954 | A1* | 5/2009 | Bouru | F01D 17/162 |
| | | | | 415/125 |
| 2010/0189549 | A1 | 7/2010 | Gilman et al. | |
| 2012/0042507 | A1 | 2/2012 | Lozier | |
| 2013/0058763 | A1* | 3/2013 | Keegan | F01D 17/162 |
| | | | | 415/148 |
| 2013/0216360 | A1* | 8/2013 | Takaoka | F01D 17/162 |
| | | | | 415/150 |
| 2016/0130946 | A1* | 5/2016 | Rose | B23K 15/0093 |
| | | | | 415/208.1 |

FOREIGN PATENT DOCUMENTS

| | | |
|---|---|---|
| JP | 59-231106 A | 12/1984 |
| JP | 6-37596 U | 5/1994 |
| JP | 2004-124849 A | 4/2004 |
| JP | 2004124849 A * | 4/2004 |
| JP | 2006-194243 A | 7/2006 |
| JP | 2009-97510 A | 5/2009 |
| JP | 2010-1821 A | 1/2010 |
| WO | 2013/087863 A1 | 6/2013 |

OTHER PUBLICATIONS

International Search Report w/English translation and Written Opinion in Japanese dated Aug. 25, 2015, issued in counterpart International Application No. PCT/JP2015/067631 (8 pages).

Office Action dated Jun. 3, 2016, issued in counterpart Taiwanese Patent Application No. 104121495 w/English translation (8 pages).

Office Action dated Jan. 18, 2017, issued in counterpart Taiwanese Application No. 104121495, with English translation (5 pages).

* cited by examiner

VARIABLE VANE DEVICE MAINTENANCE METHOD AND VARIABLE VANE DEVICE

FIELD

The present disclosure relates to a variable vane device provided at an air inlet of an axial compressor of a gas turbine, a turbo refrigerator, a jet engine, or the like, and to a variable vane device maintenance method.

BACKGROUND

A general gas turbine includes a compressor, a combustor, and a turbine. The compressor generates high-temperature/high-pressure compressed air by compressing air taken from an air inlet. The combustor obtains a high-temperature/high-pressure combustion gas by supplying fuel to the compressed air and burning the mixture. The turbine is driven by the combustion gas to drive a generator coaxially connected thereto.

In the gas turbine, a variable vane device is provided at the air inlet of the compressor. The variable vane device is used to control an air intake amount by swinging a direction of vanes in an idling state or a high-speed rotation state of the gas turbine relative to the direction of the vanes at a rated rotation speed. Accordingly, performance can be kept or improved. As a variable vane driving method and a variable vane driving device for the axial compressor, for example, Patent Literature 1 below is known.

CITATION LIST

Patent Literature

Patent Literature 1: Japanese Laid-open Patent Publication No. 2010-001821

SUMMARY

Technical Problem

In the variable vane device, an outer peripheral portion of a ring standing in the vertical direction is rotatably supported by a plurality of guide rollers and the ring is rotated by an actuator so that a plurality of variable vanes disposed in an annular shape are swung through a driving force transmission mechanism. In a case where an opening is changed in accordance with the rotation of the variable vanes, the ring is rotated by a predetermined angle by an actuator. For that reason, the guide rollers each support the ring only at a predetermined same area in a contact state and thus the ring decreases in thickness due to the abrasion of the contact portion. When the ring decreases in thickness, the guide rollers cannot appropriately support the ring. As a result, there is concern that the angle of the variable vanes cannot be accurately adjusted in accordance with a swing.

The present disclosure is made to solve the above-described problems and an object thereof is to provide a variable vane device maintenance method and a variable vane device capable of keeping performance by preventing an operation failure of variable vanes.

Solution to Problem

To achieve the object above, a variable vane device maintenance method of the present disclosure is for a variable vane device provided in a rotary machine. The variable vane device includes a plurality of variable vanes disposed in an annular shape to surround a fluid passage, a ring supported to be rotatable about a center axis of the rotary machine by a plurality of guides provided at an outer peripheral portion of the rotary machine, and connected to the plurality of variable vanes, an attachment bracket fixed to the ring, and a driving device connected to the attachment bracket, the driving device rotating the ring to swing the plurality of variable vanes. The variable vane device maintenance method includes a preparation step of preparing the ring including a first connection portion at which the attachment bracket is attached and a second connection portion at which the attachment bracket is attached at a position shifted from the first connection portion in a circumferential direction, the ring having the attachment bracket attached at the first connection portion; a release step of releasing a connection between the plurality of variable vanes and the ring and a connection between the ring and the attachment bracket at the first connection portion; a rotation step of rotating the ring by a predetermined angle; and a connection step of connecting the plurality of variable vanes to the ring at positions different from positions before the release step and connecting the ring to the attachment bracket at the second connection portion.

Thus, when the ring is abraded at the support position by the guide, the ring having the attachment bracket attached at the first connection portion is prepared, the connection between the plurality of variable vanes and the ring and the connection between the ring and the attachment bracket at the first connection portion are released, and the ring is rotated by a predetermined angle. After that, the plurality of variable vanes are connected to the ring at positions different from positions before the release step, and the ring is connected to the attachment bracket at the second connection portion. For that reason, since the positions of the ring supported by the plurality of guides are changed, the plurality of guides can support the ring at unabraded positions. Accordingly, since an operation failure of the variable vanes is prevented, performance can be kept.

In the variable vane device maintenance method of the present disclosure, the plurality of variable vanes are connected to the ring through a link mechanism, the link mechanism is disassembled in the release step, and the link mechanism is assembled in the connection step.

Thus, since a relation between the plurality of variable vanes and the ring is changed by the disassembly and the assembly of the link mechanism, workability can be improved.

In the variable vane device maintenance method of the present disclosure, the ring is rotated by an integer times an angle of an arrangement interval of the plurality of variable vanes in the rotation step.

Thus, since the ring is rotated by an integer times an angle of the arrangement interval of the plurality of variable vanes to change a relation between the plurality of variable vanes and the ring, the positions of the ring supported by using the plurality of guides can be changed without changing an operation area of the variable vanes.

In the variable vane device maintenance method of the present disclosure, the ring is rotated by 180° in the rotation step.

Thus, since the weight of the ring is supported by the guides, the portions at the lower part of the ring supported by the guides are easily abraded. Accordingly, the positions of the ring abraded by the plurality of guides can be changed simply by the rotation of the ring by 180°.

A variable vane device of the present disclosure is for a rotary machine. The variable vane device includes a plurality of variable vanes disposed in an annular shape to surround a fluid passage; a ring that is supported to be rotatable about a center axis of the rotary machine by a plurality of guides provided at an outer peripheral portion of the rotary machine, is connected to the plurality of the variable vanes, and is provided with a plurality of connection portions shifted from each other in a circumferential direction; and a driving device that rotates the ring while being connected to one of the plurality of connection portions.

Thus, the ring is provided with the plurality of connection portions shifted from each other in the circumferential direction, and the ring is rotated by a predetermined opening degree to connect the driving portion to a different connection portion when the ring is abraded at the positions supported by the guides. Accordingly, since the positions of the ring supported by the plurality of guides are changed, the plurality of guides can support the ring at unabraded positions. As a result, since an operation failure of the variable vanes is prevented, performance can be kept.

Advantageous Effects

According to the variable vane device maintenance method and the variable vane device of the present disclosure, when the ring is abraded at the positions supported by the guides, the connection between the plurality of variable vanes and the ring is released, and the ring is rotated by a predetermined opening degree. After that, the plurality of variable vanes are connected to the ring at positions different from the positions before the release step. Accordingly, since the positions of the ring supported by the plurality of guides are changed, the plurality of guides can support the ring at unabraded positions. As a result, since an operation failure of the variable vanes is prevented, performance can be kept.

DESCRIPTION OF EMBODIMENTS

Hereinafter, disclosed embodiments of a variable vane device maintenance method and a variable vane device according to the present disclosure will be described in detail with reference to the accompanying drawings. In addition, the present disclosure is not limited to the embodiments and includes a combination of embodiments in the case of a plurality of embodiments.

First Embodiment

Figure 8:
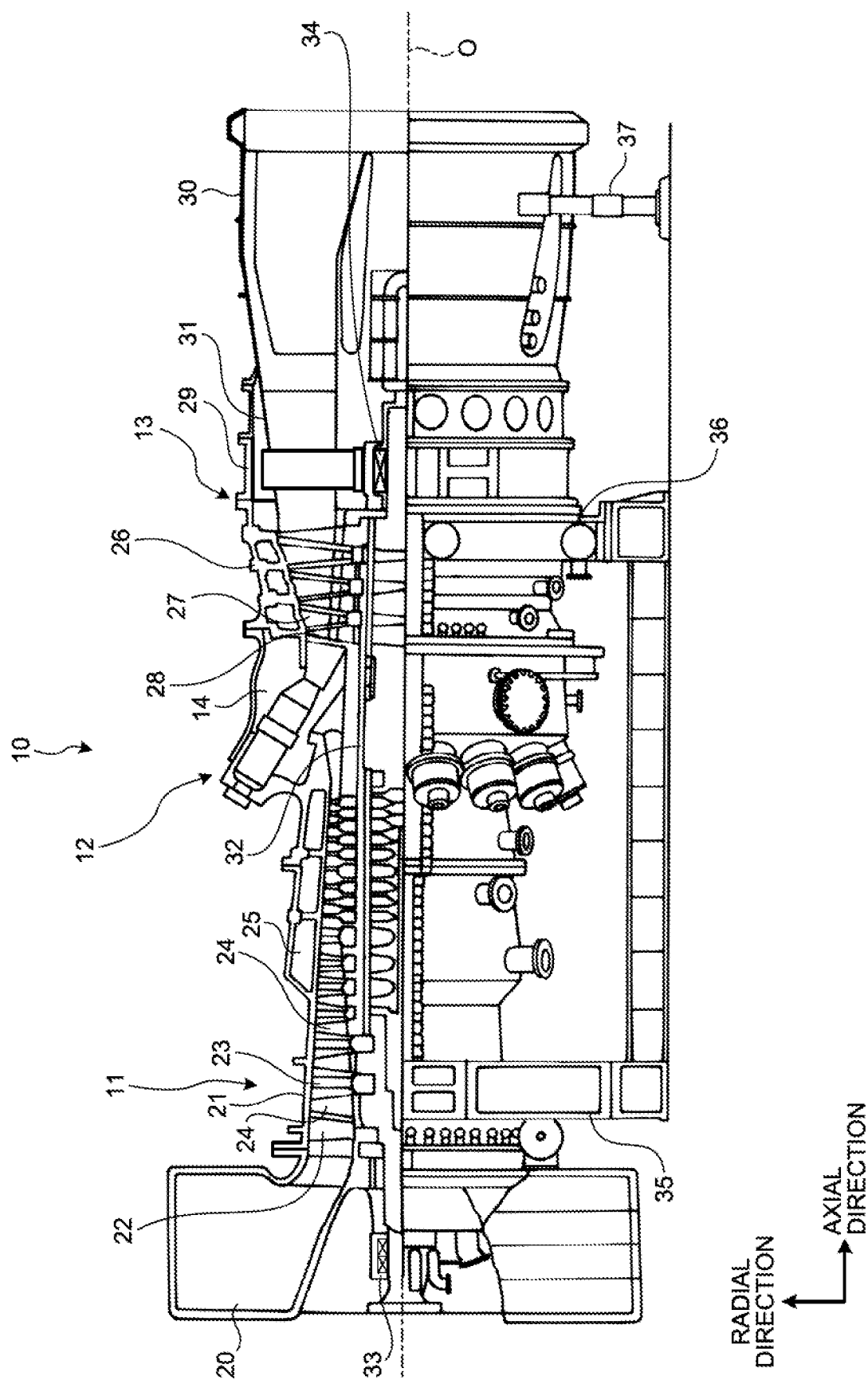
FIG. 8 is a schematic diagram illustrating an entire configuration of a gas turbine.

FIG. 8 is a schematic diagram illustrating an entire configuration of a gas turbine of a first embodiment.

In the embodiment, as illustrated in FIG. 8, a gas turbine 10 includes a compressor 11, a combustor 12, and a turbine 13. In the gas turbine 10, the compressor 11 and the turbine 13 are disposed along a direction of an axis O at the outside of a rotation shaft 32 and a plurality of the combustors 12 are disposed between the compressor 11 and the turbine 13. Then, the gas turbine 10 can generate electric power with a generator (a motor) (not illustrated) coaxially connected thereto.

The compressor 11 includes an air inlet 20 which takes air. Here, inlet guide vanes (IGVs) 22 serving as variable vanes are disposed inside a compressor casing 21, a plurality of vanes 23 and a plurality of blades 24 are alternately disposed in an air flow direction (the direction of the axis O of the rotor 32 to be described later), and a bleed air chamber 25 is provided at the outside thereof. The compressor 11 compresses the air taken from the air inlet 20 to generate high-temperature, high-pressure compressed air and supplies the high-temperature/high-pressure compressed air to a casing 14. The compressor 11 is activated by the motor coaxially connected thereto.

The combustor 12 generates a combustion gas by supplying fuel to the high-temperature, high-pressure compressed air compressed by the compressor 11 and stored in the casing 14, and burning the mixture. In the turbine 13, a plurality of vanes 27 and the plurality of blades 28 are alternately disposed in a combustion gas flow direction (the direction of the axis O of the rotor 32) inside a turbine casing 26. Then, an exhaust chamber 30 is disposed at the downstream side of the turbine casing 26 through an exhaust casing 29, and the exhaust chamber 30 includes an exhaust diffuser 31 connected to the turbine 13. The turbine 13 is driven by the combustion gas supplied from the combustor 12 and drives the generator coaxially connected thereto.

In the compressor 11, the combustor 12, and the turbine 13, the rotor (the rotation shaft) 32 is disposed in the direction of the axis O to penetrate a center portion of the exhaust chamber 30. The rotor 32 has an end near the compressor 11 supported by a bearing portion 33 so as to be rotatable and an end near the exhaust chamber 30 supported by a bearing portion 34 so as to be rotatable. Then, a stack of a plurality of discs equipped with the blades 24 is fixed to the rotor 32 in the compressor 11. Further, a stack of a plurality of discs equipped with the blades 28 is fixed to the rotor 32 in the turbine 13, and a drive shaft of the generator is connected to the end of the rotor 32 near the exhaust chamber 30.

Then, in the gas turbine 10, the compressor casing 21 of the compressor 11 is supported by a leg portion 35, the turbine casing 26 of the turbine 13 is supported by a leg portion 36, and the exhaust chamber 30 is supported by a leg portion 37.

Thus, in the compressor 11, the air taken from the air inlet 20 is compressed while passing through the inlet guide vanes 22 and the plurality of vanes 23 and the blades 24, so that high-temperature, high-pressure compressed air is obtained. In the combustor 12, a predetermined fuel is supplied to the compressed air and both fuel and air are burned. In the turbine, the high-temperature, high-pressure combustion gas generated by the combustor 12 drives and rotates the rotor 32 while passing through the plurality of vanes 27 and the blades 28 in the turbine 13, and thus the generator connected to the rotor 32 is driven. Then, the combustion gas having driven the turbine 13 is discharged as a flue gas to an atmosphere.

Figure 1:
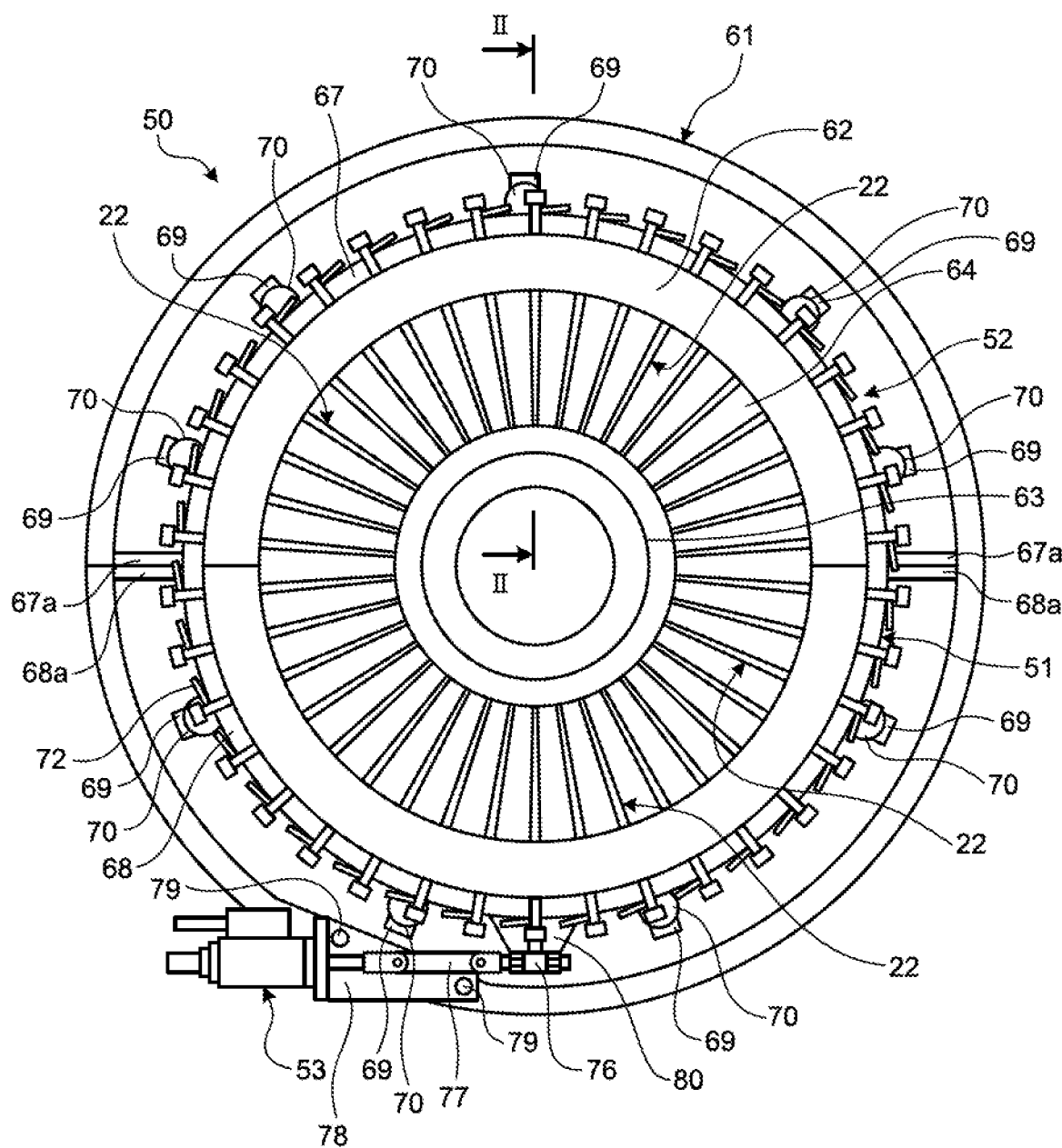
FIG. 1 is a front view illustrating a variable vane device of a first embodiment.

Here, the inlet guide vane 22 provided in the compressor 11 will be described in detail. FIG. 1 is a front view illustrating the variable vane device of the first embodiment, FIG. 2 is a cross-sectional view illustrating a main part of the variable vane device, taken along a line II-II of FIG. 1, and FIG. 3 is a side view illustrating the variable vane device.

Figure 2:
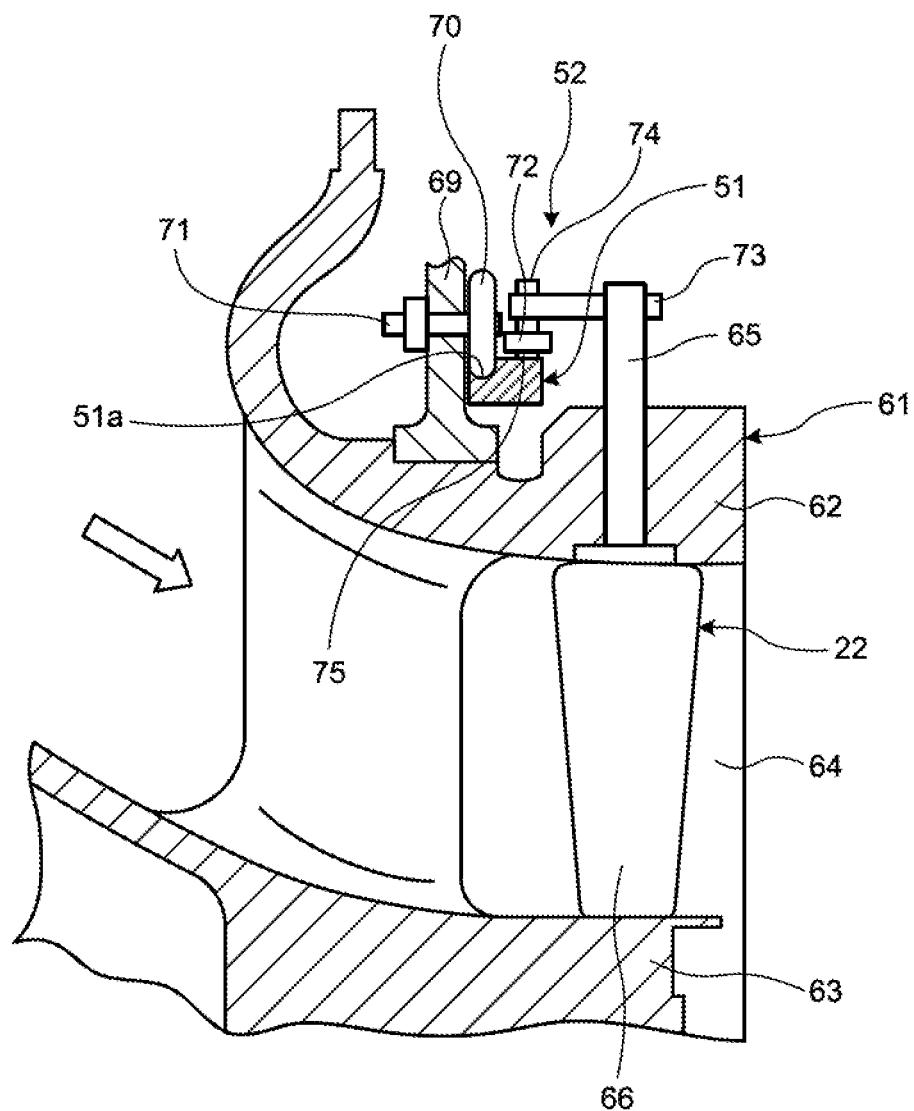
FIG. 2 is a cross-sectional view illustrating a main part of the variable vane device when taken along a line II-II of FIG. 1.
Figure 3:
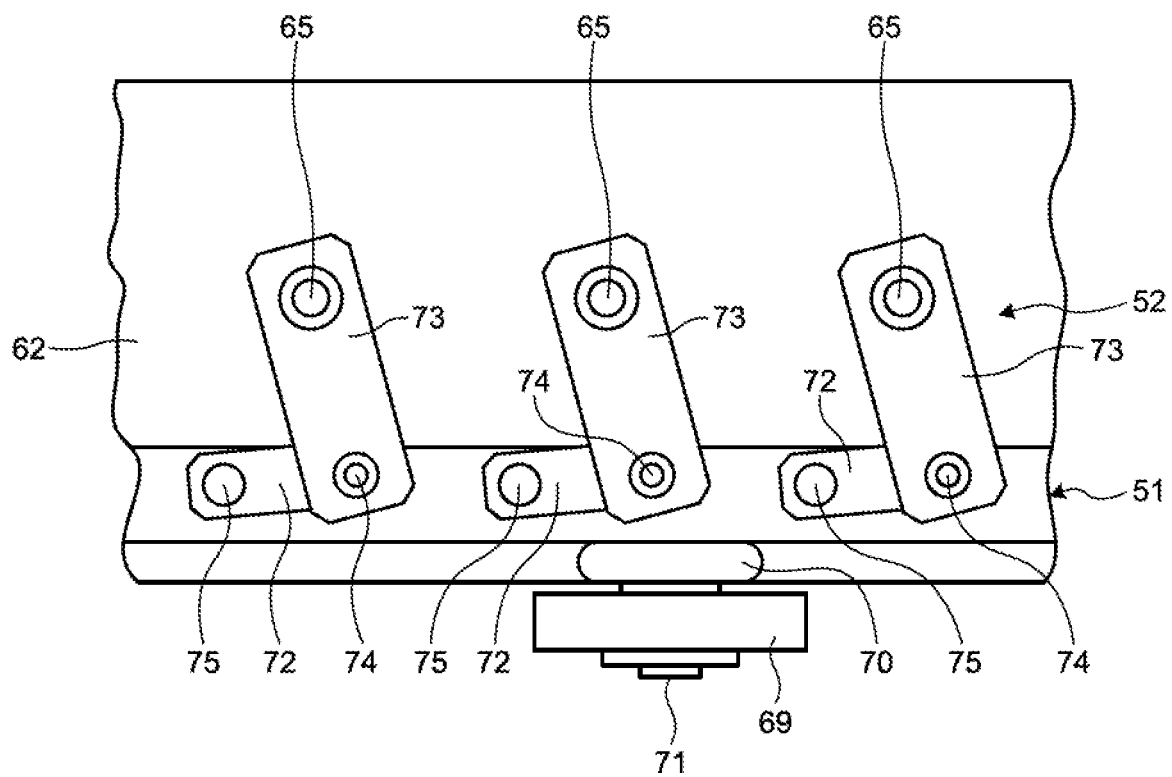
FIG. 3 is a side view illustrating the variable vane device.

As illustrated in FIGS. 1 to 3, a variable vane device 50 includes the plurality of inlet guide vanes (variable vanes) 22, a ring 51, a driving force transmission mechanism 52, and a driving device 53.

A casing 61 is formed in a double cylindrical shape and an annular passage 64 is formed between an external cylinder 62 and an inner cylinder 63. The inlet guide vane 22 includes a shaft, portion 65 and a vane portion 66. The plurality of inlet guide vanes 22 are disposed in the casing 61 in an annular shape with a predetermined gap interposed therebetween. That is, of the inlet guide vane 22, the shaft portion 65 penetrating the external cylinder 62 is supported to be rotatable and the blade portion 66 is located at the passage 64 formed between the external cylinder 62 and the inner cylinder 63.

The ring 51 is formed in a ring shape in which an upper ring 67 and a lower ring 68 formed in half ring shapes are integrally fixed. The ring 51 is disposed at the outside of the external cylinder 62 in the casing 61. The upper ring 67 and the lower ring 68 are disposed so that flange portions 67a and 68a come into close contact with each other and are fixed by fastening bolt (not illustrated). In the casing 61, a plurality of support members 69 are fixed to an outer peripheral portion of the external cylinder 62 with a predetermined gap therebetween in the circumferential direction and a guide roller (a guide) 70 is supported by each support member 69. Each guide roller 70 is supported so as to be rotatable by each support member 69 with a support shaft 71 which is along the axial direction of the casing 61. The ring 51 is supported in an outer peripheral portion of the casing 61 so as to be rotatable while an outer peripheral support face 51a is supported by the plurality of guide rollers 70.

The driving force transmission mechanism 52 is a link mechanism and can change the angles of the plurality of inlet guide vanes 22 by transmitting a rotational force of the ring 51 to the plurality of inlet guide vanes 22. In the driving force transmission mechanism 52, one end of a first link 72 and one end of a second link 73 are connected to each other through a connection shaft 74 so as to be rotatable. Then, the other end of the first link 72 is supported by the ring 51 so as to be rotatable through a connection shaft 75 and the shaft portion 65 of the inlet guide vane 22 is integrally fixed to the other end of the second link 73.

For that reason, when the ring 51 rotates in one direction, a rotational force is transmitted to each inlet guide vane 22 through the driving force transmission mechanism (the link mechanism) 52 and thus each inlet guide vane 22 rotates in one direction to close the passage 64. Further, when the ring 51 rotates in the other direction, a driving force is transmitted to each inlet guide vane 22 through the driving force transmission mechanism (the link mechanism) 52 and thus each inlet guide vane 22 rotates in the other direction to open the passage 64.

The driving device 53 is an actuator and includes a driving rod (a driving portion) 76 which is movable in a reciprocating manner in the axial direction. The driving rod 76 includes a rotatable swing link 77. The driving device 53 is fixed to a support bracket 78 and the support bracket 78 is fixed to the casing 61 by a plurality of fastening bolts 79. Meanwhile, an attachment bracket 80 is fixed to a lower portion of the ring 51. Then, a leading end of the driving rod 76 of the driving device 53 is connected to the attachment bracket 80.

For that reason, when the driving rod 76 is moved forward by the driving device 53, a driving force is transmitted to the ring 51 through the attachment bracket 80 and thus the ring 51 rotates in one direction (in FIG. 1, a counter-clockwise direction). Further, when the driving rod 76 is moved backward by the driving device 53, a driving force is transmitted to the ring 51 through the attachment bracket 80 and thus the ring 51 rotates in the other direction (in FIG. 1, a clockwise direction). Then, a rotational force of the ring 51 is transmitted to each inlet guide vane 22 through the driving force transmission mechanism (the link mechanism) 52 and thus each inlet guide vane 22 rotates to open and close the passage 64.

Incidentally, in the variable vane device 50, the ring 51 for rotating the plurality of inlet guide vanes 22 is rotatably supported by the plurality of guide rollers 70. Then, when the ring 51 is rotated by the driving device 53, each variable vane 22 is rotated through the driving force transmission mechanism 52. In this case, since the ring 51 is rotated by a predetermined angle by the driving device 53, the guide rollers 70 each support the ring 51 while contacting only a predetermined same area. For that reason, the ring 51 is abraded and is decreased in thickness only in the areas contacting the guide rollers 70.

For that reason, in a variable vane device maintenance method of the first embodiment, an abrasion area of the ring 51 is not used by shifting a positional relation between the ring 51 and the plurality of guide rollers 70 in the circumferential direction.

Figure 4:
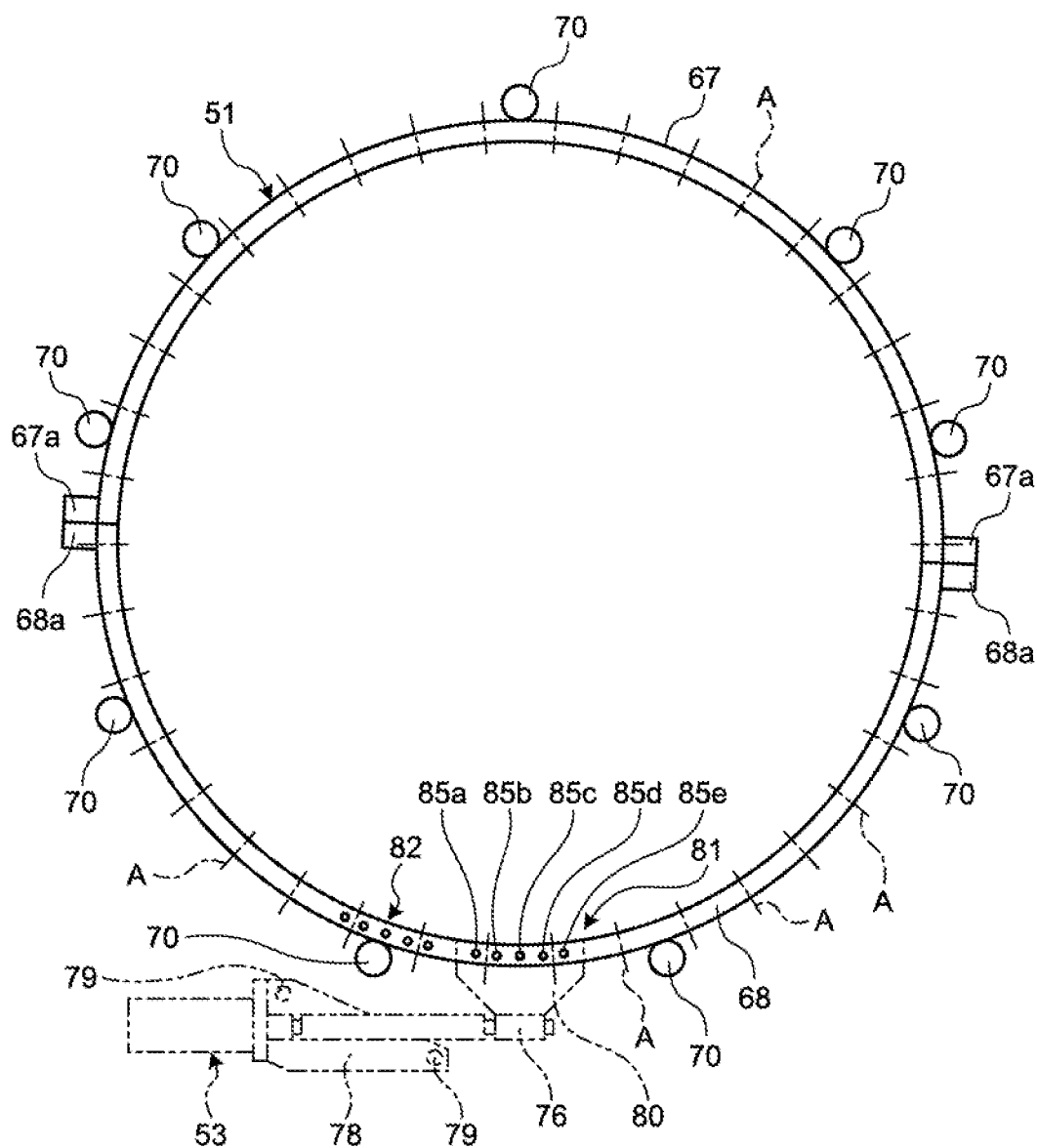
FIG. 4 is a front view illustrating an attachment state of a non-repaired ring.
Figure 5:
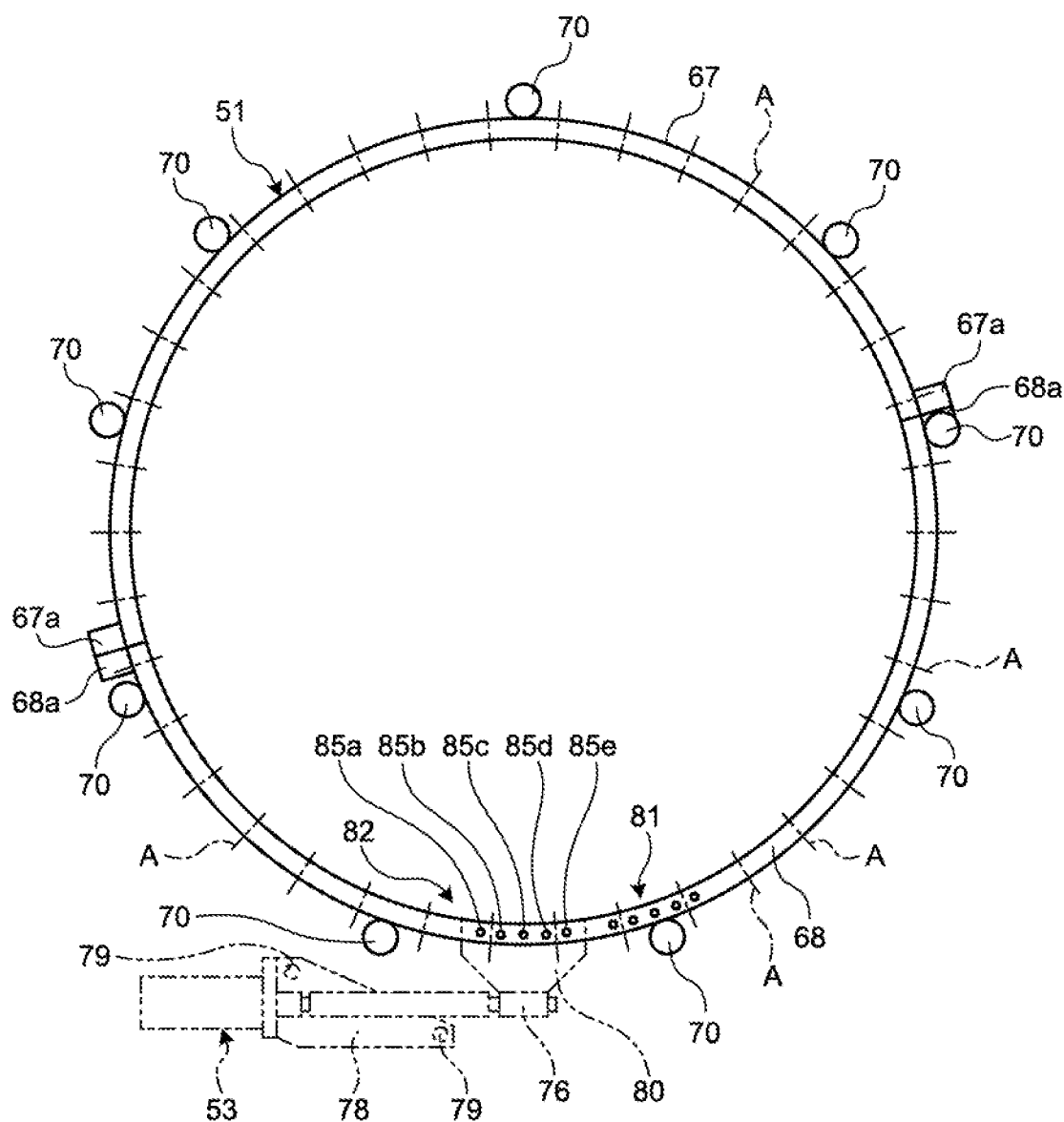
FIG. 5 is a front view illustrating an attachment state of a repaired ring.
Figure 6:
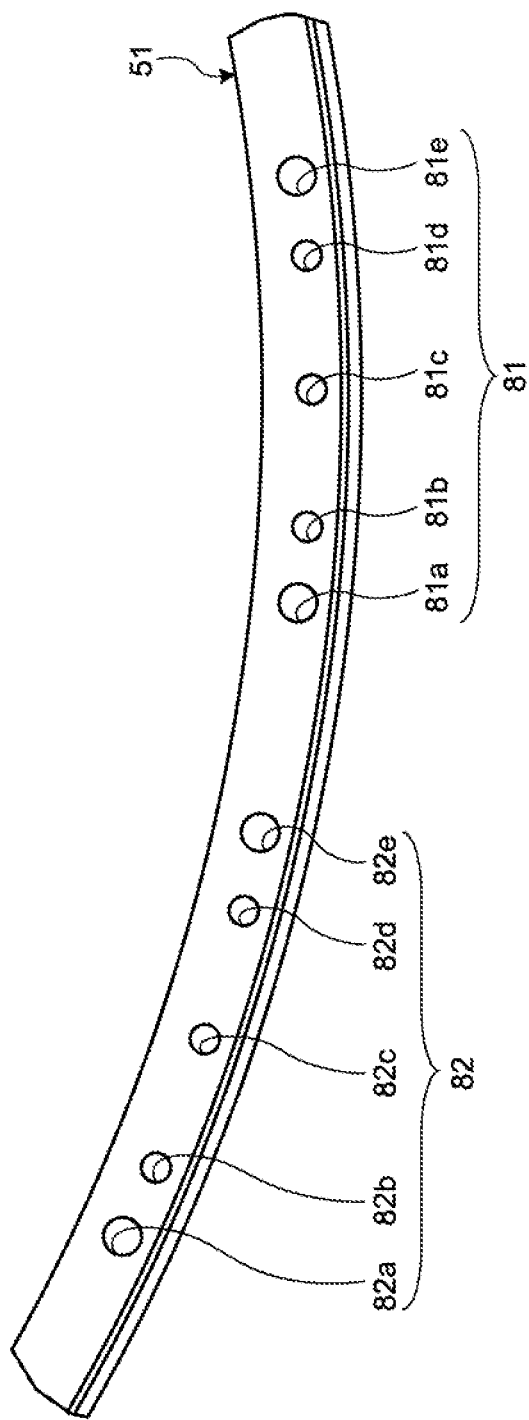
FIG. 6 is a schematic diagram illustrating a bracket attachment portions of the ring.
Figure 7:
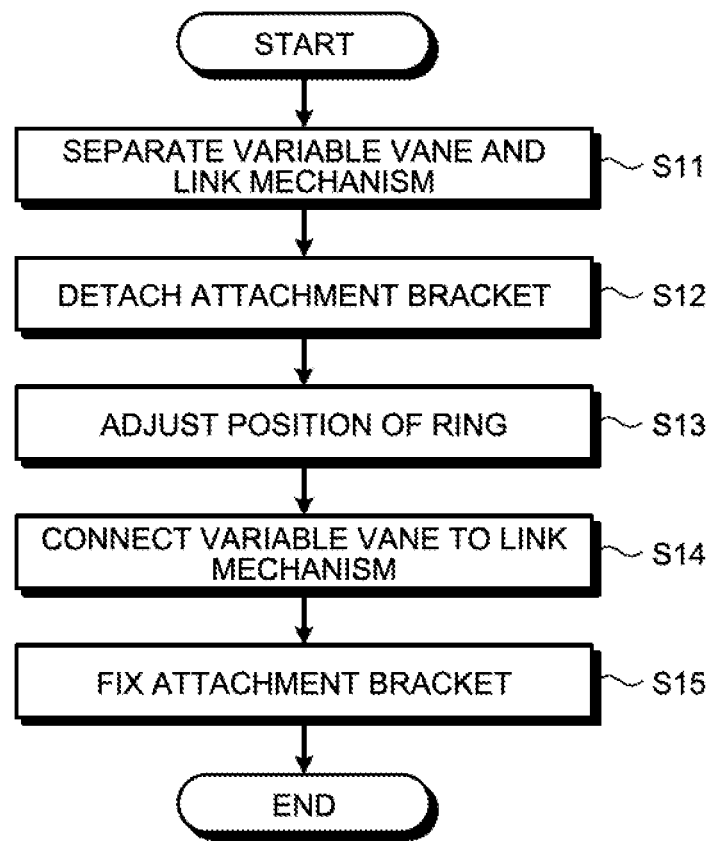
FIG. 7 is a flowchart illustrating a variable vane device maintenance method.

FIG. 4 is a front view illustrating an attachment state of a non-repaired ring, FIG. 5 is a front view illustrating an attachment state of a repaired ring, FIG. 6 is a schematic diagram illustrating bracket attachment portions of the ring, and FIG. 7 is a flowchart illustrating a variable vane device maintenance method.

The variable vane device maintenance method of the first embodiment includes a release step of releasing a connection between the plurality of variable vanes 22 and the ring 51, a rotation step of rotating the ring 51 by a predetermined angle, and a connection step of connecting the plurality of variable vanes 22 to the ring 51 at positions different from positions before the release step.

According to the variable vane device maintenance method of the first embodiment, in the release step, the connection between the plurality of variable vanes 22 and the ring 51 is released and the connection between the ring 51 and the driving device 53 is released. Further, in the connection step, the plurality of variable vanes 22 are connected to the ring 51 at positions different from positions before the release step and the ring 51 is connected to the driving device 53 at a position different from a position before the release step.

In this case, in the connection step, the attachment bracket 80 is fixed to the ring 51, and the driving rod 76 of the driving device 53 is connected to the attachment bracket 80. Here, in the connection step, the attachment bracket 80 is fixed to the ring 51 at a position different from a position before the release step. Further, the driving force transmission mechanism (the link mechanism) 52 is disassembled in the release step, and the driving force transmission mechanism 52 is assembled in the connection step.

Then, in the rotation step, it is desirable to rotate the ring 51 by an integer times an angle of the arrangement interval of the plurality of variable vanes 22. However, in the rotation step, the ring may be rotated by 180°.

Specifically, as illustrated in FIG. 6, the ring 51 is formed such that a plurality of (in the embodiment, two) connection portions 81 and 82 for attaching the attachment bracket 80 are shifted in the circumferential direction. The first connection portion 81 includes five attachment holes 81a, 81b, 81c, 81d, and 81e formed at a predetermined interval in the circumferential direction of the ring 51. The second connection portion 82 includes five attachment holes 82a, 82b, 82c, 82d, and 82e formed at a predetermined interval in the circumferential direction of the ring 51. The connection portions 81 and 82 are provided to be separated from each other by an integer times (in the embodiment, twice) an attachment pitch (a distance) of the variable vanes 22 in the ring 51.

That is, as illustrated in FIG. 4, the attachment bracket 80 overlaps the first connection portion 81 (the attachment holes 81a, 81b, 81c, 81d, and 81e) at the lower end of the ring 51 and is fastened by a plurality of fastening bolts 85. Here, the one-dotted chain lines A indicates the attachment positions of the variable vanes 22. The second connection portion 82 (the attachment holes 82a, 82b, 82c, 82d, and 82e) is provided to be shifted from the first connection portion 81 (the attachment holes 81a, 81b, 81c, 81d, and 81e) by two pitches in the clockwise direction of the ring 51. For that reason, the attachment bracket 80 is detached from the ring 51 and the ring 51 is rotated by two pitches in the counter-clockwise rotation direction. Then, as illustrated in FIG. 5, the attachment bracket 80 overlaps the second connection portion 82 (the attachment holes 82a, 82b, 82c, 82d, and 82e) and is fastened by a plurality of fastening bolts 85a, 85b, 85c, 85d, and 85e.

Here, the variable vane device maintenance method of the first embodiment will be described in detail with reference to a flowchart.

In the variable vane device maintenance method of the first embodiment, when an area of the ring 51 in contact with each guide roller 70 is abraded to cause a decrease in thickness, a positional relation between the ring 51 and the plurality of guide rollers 70 is shifted in the circumferential direction. That is, as illustrated in FIGS. 3 and 7, first, in step S11, the driving force transmission mechanism (the link mechanism) 52 is disassembled to separate the variable vanes 22 and the ring 51. In this case, the connection of the shaft portion 65 of the variable vane 22, the first link 72, the second link 73, and the connection shafts 74 and 75 is released. Alternatively, only the connection between the shaft portion 65 of the variable vane 22 and the second link 73 may be released.

Next, as illustrated in FIGS. 4 and 7, in step S12, the attachment bracket 80 is detached. In this case, the fastening bolts 85 are loosened to release the connection between the ring 51 and the attachment bracket 80, and release the connection between the attachment bracket 80 and the driving rod 76 of the driving device 53. Then, as illustrated in FIGS. 5 and 7, in step S13, the ring 51 is rotated to adjust the position. That is, since the connection between each variable vane 22 and the ring 51 is released and the connection between the ring 51 and the attachment bracket 80 is released, the ring 51 can be freely rotated. Thus, the ring 51 is rotated by two times the attachment pitch of the variable vanes 22 (by two pitches) in the counter-clockwise direction.

Subsequently, in step S14, the driving force transmission mechanism 52 is assembled to connect each variable vane 22 and the ring 51 to each other. At this time, there is a need to assemble the driving force transmission mechanism 52 without changing the angle of each variable vane 22 before the disassembly of the driving force transmission mechanism 52 and during the assembly thereof. Then, in step S15, the attachment bracket 80 is fixed to the second connection portion 82. In this case, the attachment bracket 80 overlaps the second connection portion 82 of the ring 51 and is fastened by the plurality of fastening bolts 85. In addition, the attachment bracket 80 is connected to the driving rod 76 of the driving device 53.

In this way, the variable vane device maintenance method of the first embodiment includes: a preparation step of preparing the ring 51 having the first connection portion 81 at which the attachment bracket 80 is attached to the ring 51, and the second connection portion 82 at which the attachment bracket 80 is attached at a position shifted from the first connection portion 81 in the circumferential direction, the ring 51 having to the attachment bracket 80 attached at the first connection portion 81; a release step of releasing the connection between the plurality of variable vanes 22 and the ring 51 and the connection between the ring 51 and the attachment bracket 80 at the first connection portion 81; a rotation step of rotating the ring 51 by a predetermined angle; and a connection step of connecting the plurality of variable vanes 22 to the ring 51 at positions different from positions before the release step and connecting the ring 51 to the attachment bracket 80 at the second connection portion 82.

Thus, when the ring 51 is abraded at the positions supported by the guide rollers 70, the ring 51 having the attachment bracket 80 attached at the first connection portion 81 is prepared, the connection between the plurality of variable vanes 22 and the ring 51 and the connection between the ring 51 and the attachment bracket 80 at the first connection portion 81 are released, and the ring 51 is rotated by a predetermined angle. After that, the plurality of variable vanes 22 are connected to the ring 51 at positions different from positions before the release step, and the ring 51 is connected to the attachment bracket 80 at the second connection portion 82. For that reason, since the positions of the ring 51 supported by the plurality of guide rollers 70 are changed, the plurality of guide rollers 70 can appropriately support the ring 51 in areas where no abrasion has occurred. Accordingly, since an operation failure of the variable vanes is prevented, performance can be kept.

Further, the positions of the ring 51 by the plurality of guide rollers 70 are changed without changing a connection relation between the plurality of variable vanes 22 and the ring 51 and a connection relation between the ring 51 and the driving device 53. Thus high operation accuracy of the variable vanes 22 can be kept. Further, since the attachment position of the attachment bracket 80 in the ring 51 is changed to change the position of connection between the driving device 53 and the ring 51, the positions of the ring 51 supported by the plurality of guide rollers 70 can be easily changed with a simple configuration.

In the variable vane device maintenance method of the first embodiment, the plurality of variable vanes 22 and the ring 51 are connected through the driving force transmission mechanism 52. Then, the driving force transmission mechanism 52 is disassembled in the release step and the driving force transmission mechanism 52 is assembled in the connection step. Thus, since a relation between the plurality of variable vanes 22 and the ring 51 is changed by the disassembly and the assembly of the driving force transmission mechanism 52, workability can be improved.

According to the variable vane device maintenance method of the first embodiment, in the rotation step, the ring 51 is rotated by an integer times an angle of the attachment interval of the plurality of variable vanes 22, that is, by an integer times the attachment distance between the variable vanes 22. Thus, since a relation between the plurality of variable vanes 22 and the ring 51 is changed by being shifted by the attachment distance between the variable vanes 22, the positions of the ring 51 supported by the plurality of guide rollers 70 can be changed without changing the operation area of the variable vanes.

In this case, in the rotation step, the ring 51 may be rotated by 180°. That is, since the weight of the ring 51 is supported by the guide rollers 70 disposed at lower positions, the areas supported by the guide rollers 70 at the lower portion of the ring 51 are easily abraded. For that reason, when the ring 51 is rotated by 180° to be vertically reversed, the positions of the ring 51 supported by the plurality of guide rollers 70 can be changed.

Further, the variable vane device of the first embodiment includes: the plurality of variable vanes 22 which are disposed in an annular shape to surround the passage 64; the ring 51 which is rotatably supported by the plurality of guide rollers 70 provided at the outer peripheral portion, is connected to the plurality of variable vanes 22, and is provided with the plurality of connection portions 81 and 82 shifted from each other in the circumferential direction; the driving force transmission mechanism 52 which connects the plurality of variable vanes 22 to the ring 51; and the driving device 53 of which the driving rod 76 is connected to any one of the plurality of connection portions 81 and 82 in the ring 51.

Thus, since the plurality of connection portions 81 and 82 are provided to be shifted in the circumferential direction of the ring 51, when the positions of the ring 51 supported by the guide rollers 70 are abraded, the ring 51 is rotated by a predetermined opening degree to change the connection position of the driving rod 76, for example, from the first connection portion 81 to the second connection portion 82, so that the positions of the ring 51 supported by the plurality of guide rollers 70 are changed. Accordingly, the plurality of guide rollers 70 can support the ring 51 at unabraded positions. As a result, since an operation failure of the variable vanes 22 is prevented, performance can be kept.

Further, in the embodiment, the ring 51 is provided with two connection portions 81 and 82 which are shifted in the circumferential direction, but the number of the connection portions is not limited to two and may be three or more.

Second Embodiment

Figure 9:
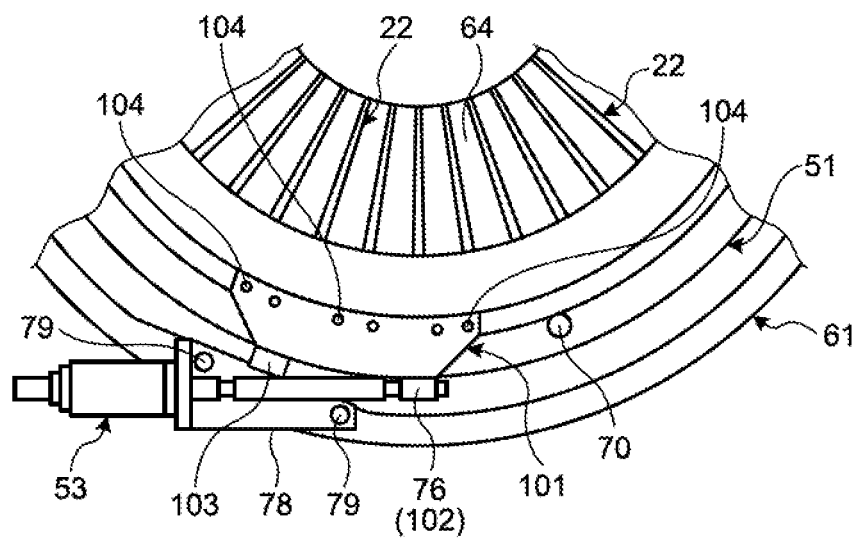
FIG. 9 is a schematic diagram illustrating a main part of a variable vane device of a second embodiment.
Figure 10:
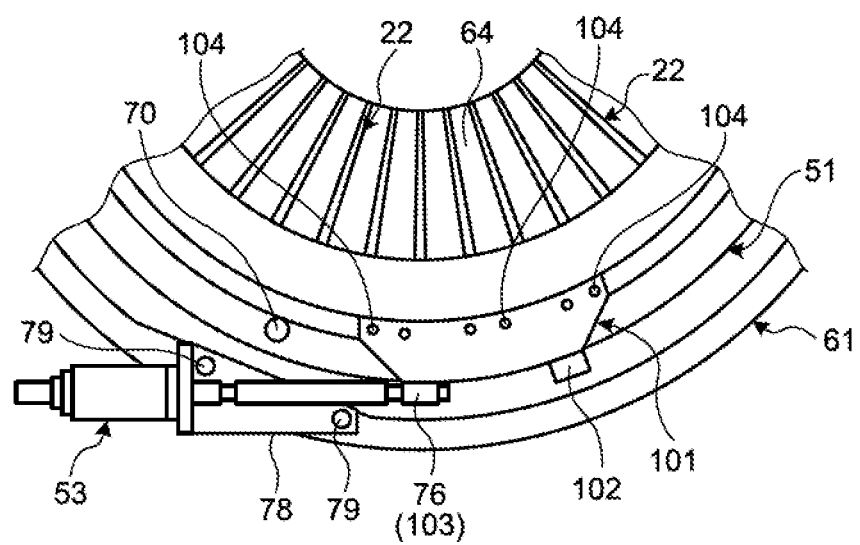
FIG. 10 is a schematic diagram illustrating a variable vane device maintenance method.

FIG. 9 is a schematic diagram illustrating a main part of a variable vane device of a second embodiment and FIG. 10 is a schematic diagram illustrating a variable vane device maintenance method. Further, the same reference numerals will be given to the same components having the same functions as those of the above-described embodiment and a detailed description thereof will be omitted.

The variable vane device maintenance method of the second embodiment includes, as illustrated in FIGS. 9 and 10, a release step of releasing a connection between a plurality of variable vanes 22 and a ring 51, a rotation step of rotating the ring 51 by a predetermined angle, and a connection step of connecting the plurality of variable vanes 22 to the ring 51 at positions different from positions before the release step.

According to the variable vane device maintenance method of the second embodiment, in the release step, the connection between the plurality of variable vanes 22 and the ring 51 is released and the connection between the ring 51 and a driving device 53 is released. Further, in the rotation step, the ring 51 is rotated by a predetermined angle. Furthermore, in the connection step, the plurality of variable vanes 22 are connected to the ring 51 at positions different from positions before the release step and the ring 51 is connected to the driving device 53 at a different position.

In this case, in the connection step, an attachment bracket 101 is fixed to the ring 51 and a driving rod 76 of the driving device 53 is connected to the attachment bracket 101 so that the driving rod 76 is connected to a different position of the attachment bracket 101.

Specifically, in the ring 51, the attachment bracket 101 is fixed by a plurality of fastening bolts 104 and the attachment bracket 101 is provided with a plurality of (in the embodiment, two) connection portions 102 and 103, shifted from each other in the circumferential direction, to be connected to the driving rod 76 of the driving device 53. The first connection portion 102 is provided at one end of the attachment bracket 101 in the longitudinal direction (the circumferential direction of the ring 51) and the second connection portion 103 is provided at the other end of the attachment bracket 101 in the longitudinal direction (the circumferential direction of the ring 51). The connection portions 102 and 103 are provided to be separated from each other by an integer times (in the embodiment, twice) an attachment pitch (a distance) of the variable vanes 22 in the ring 51.

When an area of the ring 51 in contact with each guide roller 70 is abraded to cause a decrease in thickness, a positional relation between the ring 51 and the plurality of guide rollers 70 is shifted in the circumferential direction. That is, a driving force transmission mechanism (a link mechanism) 52 is first disassembled to separate the variable vanes 22 and the ring 51. Next, the connection between the driving rod 76 of the driving device 53 and the first connection portion 102 of the attachment bracket 101 is released. Then, the ring 51 is rotated by twice of the attachment pitch of the variable vanes 22 (by two pitches) in the counter-clockwise direction.

Subsequently, the driving force transmission mechanism 52 is assembled to connect the variable vanes 22 to the ring 51. Then, the driving rod 76 of the driving device 53 is connected to the second connection portion 103 of the attachment bracket 101.

In this way, the variable vane device maintenance method of the second embodiment includes a preparation step of preparing the ring 51 having the attachment bracket 101 attached at the first connection portion 102; a release step of releasing the connection between the plurality of variable vanes 22 and the ring 51 and the connection between the ring 51 and the attachment bracket 101 at the first connection portion 102; a rotation step of rotating the ring 51 by a predetermined angle; and a connection step of connecting the plurality of variable vanes 22 to the ring 51 at positions different from positions before the release step and connecting the ring 51 to the attachment bracket 101 at the second connection portion 103. Accordingly, the attachment bracket 101 including the plurality of connection portions 102 and 103 is fixed to the ring 51 so that the driving rod 76 of the driving device 53 is connectable to any one of the connection portions 102 and 103.

Thus, when the ring 51 is abraded at the positions supported by the guide rollers 70, the ring 51 having the attachment bracket 101 attached at the first connection portion 102 is prepared, the connection between the plurality of variable vanes 22 and the ring 51 is released while the connection between the driving rod 76 of the driving device 53 and the first connection portion 102 of the attachment bracket 101 is released, and the ring 51 is rotated by a predetermined angle. After that, the plurality of variable vanes 22 are connected to the ring 51 at positions different from positions before the release step while the driving rod 76 of the driving device 53 is connected to the second connection portion 103 of the attachment bracket 101. For that reason, since the positions of the ring 51 supported by the plurality of guide rollers 70 are changed, the plurality of guide rollers 70 can appropriately support the ring 51 in areas where the ring 51 is not abraded. Accordingly, since an operation failure of the variable vanes 22 is prevented, performance can be kept. Further, since the attachment position of the driving rod 76 in the bracket 101 is changed to change the position of connection between the driving device 53 and the ring 51, the attachment bracket 101 does not need to be detached and the positions of the ring 51 by the plurality of guide rollers 70 can be changed with a simple configuration.

Third Embodiment

Figure 11:
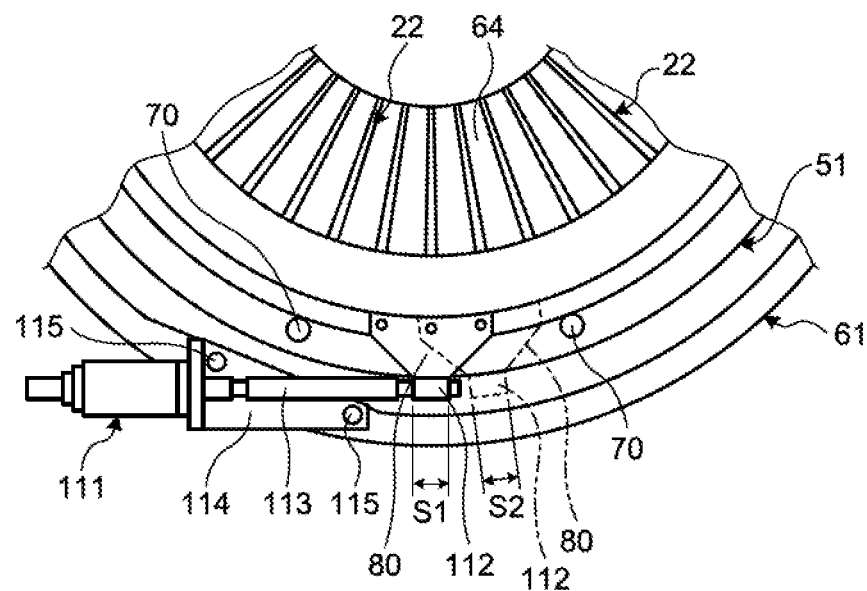
FIG. 11 is a schematic diagram illustrating a main part of a variable vane device of a third embodiment.

FIG. 11 is a schematic diagram illustrating a main part of a variable vane device of a third embodiment. Further, the same reference numerals will be given to the same components having the same functions as those of the above-described embodiment, and a detailed description thereof will be omitted.

A variable vane device maintenance method of the third embodiment includes, as illustrated in FIG. 11, a release step of releasing a connection between a plurality of variable vanes 22 and a ring 51, a rotation step of rotating the ring 51 by a predetermined angle, and a connection step of connecting the plurality of variable vanes 22 to the ring 51 at positions different from a position before the release step.

In this case, a driving device 111 has a stroke larger than a rotation stroke of the variable vane 22. The driving device 111 is an actuator and includes a driving rod (a driving portion) 112 which is movable in a reciprocating manner in the axial direction. The driving rod 112 includes a rotatable swing link 113. The driving device 111 is fixed to a support bracket 114 and the support bracket 114 is fixed to a casing 61 by a plurality of fastening bolts 115. Then, a leading end of the driving rod 112 of the driving device 111 is connected to the attachment bracket 80.

When an area of the ring 51 in contact with each guide roller 70 is abraded to cause a decrease in thickness, a positional relation between the ring 51 and the plurality of guide rollers 70 is shifted in the circumferential direction. That is, a driving force transmission mechanism (a link mechanism) 52 is first disassembled to separate the variable vanes 22 and the ring 51. Next, the driving device 111 is driven to lengthen a driving rod 76 and the ring 51 is rotated by an attachment pitch of the variable vane 22 in the counter-clockwise direction. Subsequently, the driving force transmission mechanism 52 is assembled to connect the variable vanes 22 to the ring 51. Then, in the driving device 111, a stroke S1 of the variable vane 22 is changed to a stroke S2.

In this way, in the variable vane device maintenance method of the third embodiment, a stroke area in which the variable vane 22 is rotated by the driving device 111 between a fully open state and a fully closed state is changed in the circumferential direction of the ring 51. Thus, when the ring 51 is abraded at the positions supported by the guide rollers 70, the connection between the plurality of variable vanes 22 and the ring 51 is released, the ring 51 is rotated by a predetermined angle, and the plurality of variable vanes 22 are connected to the ring 51 at positions different from positions before the release step. For that reason, since the positions of the ring 51 supported by the plurality of guide rollers 70 are changed, the plurality of guide rollers 70 can appropriately support the ring 51 in an area where the ring 51 is not abraded. As a result, since an operation failure of the variable vanes 22 is prevented, performance can be kept. At this time, since the stroke area of the driving device 111 is changed in the circumferential direction of the ring 51 to change the positions of the ring 51 supported by the guide rollers 70, the attachment bracket 101 does not need to be detached and the positions of the ring 51 by the plurality of guide rollers 70 can be easily changed with a simple configuration.

Fourth Embodiment

Figure 12:
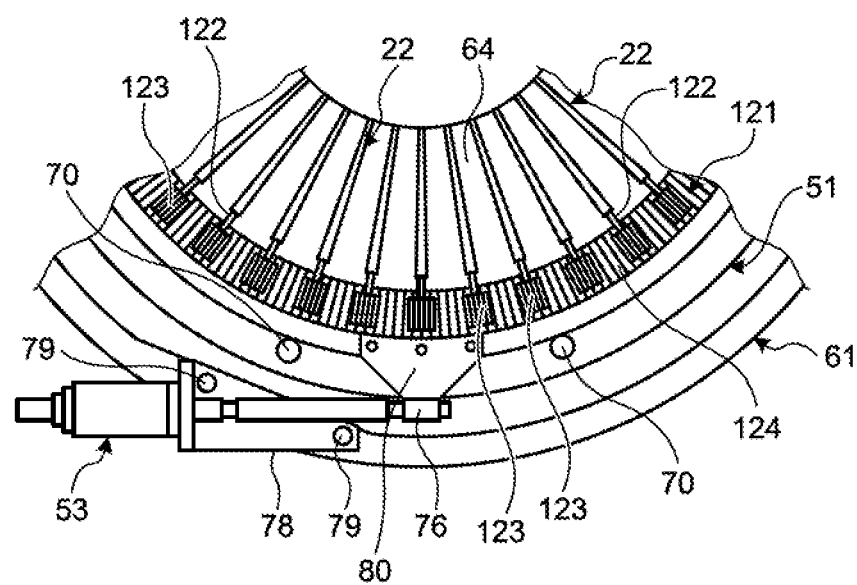
FIG. 12 is a schematic diagram illustrating a main part of a variable vane device of a fourth embodiment.

FIG. 12 is a schematic diagram illustrating a main part of a variable vane device of a fourth embodiment. Further, the same reference numerals will be given to the same components having the same functions as those of the above-described embodiment and a detailed description thereof will be omitted.

A variable vane device maintenance method of the fourth embodiment includes, as illustrated in FIG. 12, a release step of releasing a connection between a plurality of variable vanes 22 and a ring 51 while releasing a connection between the ring 51 and a driving device 53, a rotation step of rotating the ring 51 by a predetermined angle, and a connection step of connecting the plurality of variable vanes 22 to the ring 51 at different positions while connecting the ring 51 to the driving device 53 at a position different from a position before the release step.

A driving force transmission mechanism 121 is a gear mechanism and can change an angle of each of the plurality of inlet guide vanes 22 by transmitting a rotational force of the ring 51 to the plurality of inlet guide vanes 22. That is, a driving gear 123 is fixed to a shaft portion 122 of the inlet guide vane 22, a rack 124 is provided in the ring 51, and the driving gear 123 of each inlet guide vane 22 engages with the rack 124 of the ring 51.

For that reason, when the ring 51 rotates, a rotational force is transmitted to each inlet guide vane 22 through the driving force transmission mechanism (the gear mechanism) 121 so that each inlet guide vane 22 rotates and a passage 64 is opened and closed.

When an area of the ring 51 in contact with each guide roller 70 is abraded to cause a decrease in thickness, a positional relation between the ring 51 and the plurality of guide rollers 70 is shifted in the circumferential direction. That is, the driving force transmission mechanism 121 is first disassembled to separate the variable vanes 22 and the ring 51. Next, a connection between a driving rod 76 of the driving device 53 and an attachment bracket 80 is released.

Then, the ring 51 is rotated by twice an attachment pitch of the variable vanes 22 (by two pitches) in the counter-clockwise direction.

Subsequently, the driving force transmission mechanism 121 is assembled to connect the variable vanes 22 to the ring 51. Then, the driving rod 76 of the driving device 53 is connected to the attachment bracket 80.

In this way, the variable vane device maintenance method of the fourth embodiment includes a release step of releasing the connection between the plurality of variable vanes 22 and the ring 51; a rotation step of rotating the ring 51 by a predetermined angle; and a connection step of connecting the plurality of variable vanes 22 to the ring 51 at positions different from positions before the release step.

Thus, since the positions of the ring 51 supported by the plurality of guide rollers 70 are changed, the plurality of guide rollers 70 can appropriately support the ring 51 in areas where the ring 51 is not abraded. As a result, since an operation failure of the variable vane 22 is prevented, performance can be kept.

Further, the variable vane device maintenance method of the present is not limited to the above-described embodiments. For example, a configuration may be employed in which the connection between the plurality of variable vanes and the ring is released while the connection between the casing and the driving device is released, the ring is rotated by a predetermined opening degree, and the plurality of variable vanes are connected to the ring at different positions while the casing is connected to the driving device at a different position.

Further, a configuration may be employed in which a position adjustment mechanism operated by an engagement between a pin and an elongated hole is provided in at least one of a gap between the ring and the attachment bracket, a gap between the attachment bracket and the driving portion, and a gap between the driving device and the casing, and the positions of both components are adjusted before both components are immovably fixed by a fastening bolt.

Further, when the positions of the plurality of guide rollers are adjustable in the circumferential direction of the ring 51 in the casing, the support positions of the ring may be changed while the positions of the plurality of guide rollers are shifted.

Further, in the embodiments, the guide of the present disclosure is configured as the guide roller 70, but the present disclosure is not limited to a rolling roller. For example, a sliding slide member may be also employed.

REFERENCE SIGNS LIST

10 Gas Turbine (Rotary Machine)
11 Compressor
12 Combustor
13 Turbine
14 Casing
21 Compressor Casing
22 Inlet Guide Vane (Variable Vane)
23 Vane
24 Blade
32 Rotor (Rotation Shaft)
50 Variable Vane Device
51 Ring
52 Driving Force Transmission Mechanism (Link Mechanism)
53, 111 Driving Device
61 Casing
64 Passage
70 Guide Roller (Guide)
72 First Link
73 Second Link
76, 112 Driving Rod (Driving Portion)
80, 101 Attachment Bracket
81, 102 First Connection Portion
82, 103 Second Connection Portion
85 Fastening Bolt
121 Driving Force Transmission Mechanism
123 Driving Gear
124 Rack

The invention claimed is:

1. A variable vane device maintenance method for a variable vane device provided in a rotary machine, the variable vane device including:
   a plurality of variable vanes disposed in an annular shape to surround a fluid passage;
   a ring supported to be rotatable about a center axis of the rotary machine by a plurality of guides provided at an outer peripheral portion of the rotary machine, and connected to the plurality of variable vanes;
   an attachment bracket fixed to the ring; and
   a driving device connected to the attachment bracket, the driving device rotating the ring to swing the plurality of variable vanes,
   the variable vane device maintenance method comprising:
   a preparation step of preparing the ring including a first connection portion at which the attachment bracket is attached and a second connection portion at which the attachment bracket is attached at a position shifted from the first connection portion in a circumferential direction, the ring having the attachment bracket attached at the first connection portion;
   a release step of releasing a connection between the plurality of variable vanes and the ring and a connection between the ring and the attachment bracket at the first connection portion;
   a rotation step of rotating the ring by a predetermined angle; and
   a connection step of connecting the plurality of variable vanes to the ring at positions different from positions before the release step and connecting the ring to the attachment bracket at the second connection portion.

2. The variable vane device maintenance method according to claim 1, wherein
   the plurality of variable vanes are connected to the ring through a link mechanism, the link mechanism is disassembled in the release step, and the link mechanism is assembled in the connection step.

3. The variable vane device maintenance method according to claim 1, wherein
   the ring is rotated by 180° in the rotation step.

* * * * *